United States Patent [19]

Crouse

[11] Patent Number: 4,750,523
[45] Date of Patent: Jun. 14, 1988

[54] ACTIVE ATTENUATOR AND METHOD

[75] Inventor: Jere W. Crouse, Beloit, Wis.

[73] Assignee: Beloit Corporation, Beloit, Wis.

[21] Appl. No.: 114,334

[22] Filed: Oct. 30, 1987

[51] Int. Cl.⁴ ............................................. F16L 55/04
[52] U.S. Cl. ..................................... 138/30; 138/26;
 73/196; 73/199; 137/1; 137/14; 162/380;
 181/206
[58] Field of Search ...................... 138/26, 30; 73/195,
 73/196, 199, 262, 269, 707, 861; 162/216, 336,
 340, 341, 100, 198; 137/1, 14, 207, 455, 551,
 557, 826, 829, 831, 832; 181/237, 206

[56] References Cited

U.S. PATENT DOCUMENTS

| | | |
|---|---|---|
| 2,983,720 | 5/1961 | Leary et al. . |
| 3,415,118 | 12/1968 | McQueen et al. ..................... 73/199 |
| 3,500,826 | 3/1970 | Haire ................... 73/199 X |
| 3,633,420 | 1/1972 | Holzem ................... 73/199 |
| 3,650,891 | 3/1972 | Dahlin ........................... 162/380 X |
| 3,882,723 | 5/1975 | Wickham ............................... 73/199 |
| 4,030,971 | 6/1977 | Justus ..................... 162/216 |
| 4,122,303 | 10/1978 | Chaplin et al. . |
| 4,153,815 | 5/1979 | Chaplin et al. . |
| 4,262,700 | 4/1981 | Moen ..................... 138/26 |
| 4,285,245 | 8/1981 | Kennedy ........................... 73/199 X |
| 4,308,095 | 12/1981 | Brendemuehl ................... 138/26 X |
| 4,407,330 | 10/1983 | Fujiwara ............................ 138/30 |
| 4,417,098 | 11/1983 | Chaplin et al. . |
| 4,480,333 | 10/1984 | Ross . |
| 4,489,441 | 12/1984 | Chaplin . |
| 4,490,841 | 12/1984 | Chaplin et al. . |
| 4,523,977 | 6/1985 | Cantini .............................. 138/26 |
| 4,527,282 | 7/1985 | Chaplin et al. . |
| 4,566,118 | 1/1986 | Chaplin et al. . |

FOREIGN PATENT DOCUMENTS 1585098  2/1981  United Kingdom ................. 73/199

OTHER PUBLICATIONS

"Turn On The Quiet"-Brochure.

Primary Examiner—James E. Bryant, III
Attorney, Agent, or Firm—Dirk J. Veneman; Raymond W. Campbell; Gerald A. Mathews

[57] ABSTRACT

An active attenuation system is provided for attenuating the pressure pulses in a liquid flowing in a pipe. The system includes an actuator for introducing nulling pressure pulses into the pipeline having the same frequency, but phase reversed to provide opposite amplitude of the pressure pulses to be attenuated. A plurality of pressure sensors are disposed in the pipe to sense the pressure pulses to be attenuated and these sensors are connected to a pressure transducer amplifier system which, in turn, is electrically connected to a control monitor which adaptively models the responses and continuously adjusts its output to a power amplifier which, in turn, signals the actuator to produce nulling pulses at the desired frequency and amplitude to attenuate the pressure pulses at a desired location, i.e. headbox or pipeline termination, in the liquid flowing through the pipe.

9 Claims, 6 Drawing Sheets

ACTIVE ATTENUATOR AND METHOD

BACKGROUND OF THE INVENTION

This invention relates to the attenuation of pressure pulses in a liquid. More particularly, it relates to a method and apparatus for attenuating the pressure pulses in a liquid travelling in a pipe, such as an aqueous stock slurry travelling from a pump through a pipe into a papermaking machine headbox. Still more particularly, this invention relates to an active type of attenuator wherein the pressure pulses are attenuated by positive action by the attenuator as opposed to so-called passive attenuators wherein pressure pulses are attenuated by reflective movement of the attenuator apparatus responsive to pressure pulses in the travelling liquid.

Examples of so-called passive attenuators are shown and described in U.S. Pat. Nos. 4,030,971 and 4,262,700. Such passive attenuators operate by permitting the pressure pulse to distend a flexible diaphragm which is biased by pressurized gas on its opposing side. The passing pressure pulse thus dissipates its pressure against the biased diaphragm and the pulse is diminished or eliminated downstream of the attenuator. These passive types of attenuators operate well under certain operating conditions, but they also have some inherent limitations. For example, they are slow to respond to rapid fluid pressure pulsations and cannot attenuate pulsations over a broad range of frequencies, such as about 0.5 Hz to about 100 Hz. Passive attenuators also have a propensity to short circuit since vibration is transmitted structurally through the pipe as well as through the liquid travelling through the pipe. Thus, the pressure pulsation can pass from upstream of the attenuator to downstream of the attenuator through the attenuator structure even though part of the pulsation travelling in the liquid may be attenuated. Finally, passive attenuators tend to saturate at changing frequencies and pressure pulse amplitudes rather than adapt to changing conditions. To saturate is meant to experience increased fluid pressure to a point where the attenuator diaphragm is moved against its stops and maintained there so as to render it ineffective in responding to fluid pulsations.

This invention actively attenuates pressure pulses in a confined travelling liquid, such as pulp stock being pumped through a pipe into a papermaking machine headbox. Pressure sensors are attached to the pipe to sense pressure pulsations within the pipe at one or more selected locations between the fan pump and an actuator attached to the stock pipe immediately before it enters the papermaking machine headbox. These pressure input sensors are electrically-linked with a pressure transducer amplifier system connected with a controller control monitor which measures the responses and creates a model of the pressures and frequencies according to these measurements. The controller then signals a power amplifier which is connected to the actuator in the pipe immediately adjacent the inlet into the headbox. The actuator utilizes a flexible diaphragm, such as a rubber membrane mounted flush with the pipe interior wall, to produce pressure pulses which are equal in frequency and amplitude to the pressure pulses desired to be nulled, but phase reversed so as to interfere with the pressure pulse in the liquid in the pipe and null the effect of its pressure.

The input pressure sensors can be located both upstream and downstream of the actuator and separate error sensors located in the headbox and recirculation pipe outlet at the other side of the headbox can be provided to monitor the effect of the attenuating operation. The pressure pulsations sensed by the controller can therefore have travelled upstream and downstream in the pipe.

This active attenuator is a power attenuator consisting of power amplifier and actuator in that it produces pressure pulses based on the pressure pulses measured travelling in the liquid in the pipe. This attenuator can track and produce nulling pressure pulsations over a wide spectrum range of typically about 0.5 Hz to 100 Hz and achieve attenuation of typically about −10 to −30 dB of both random and periodic frequencies within the spectrum range measured. The controller, or control monitor, models all pressure pulsations received by the input sensors into a composite synthesized waveform which, in turn, is utilized by the power amplifier to drive the actuator to operate a flexible diaphragm which reproduces the pressure pulses in phased reversed form into the liquid in the pipe. The continuous monitoring and control system permits the attenuator to respond to both the periodic pressure pulsations created by rotating machinery, such as the fan pump, as well as intermittent, or random, pulsations produced by system resonances, turbulence, valves, etc.

Attenuation of pressure pulses in the stock inlet pipe carrying pulp stock into the headbox of a papermaking machine is of great importance. Upstream of the headbox are many machine components which produce, refine, screen, distribute and pump the aqueous pulp stock into the headbox. The operation of each of these machine components produces some sort of disturbance in the stock which is manifested by a random or periodic pressure pulse in the stock. The practical effect of this pressure pulse is that when the stock is projected from the headbox slice opening onto the forming wire, there are small variations (or fluctuations) in the rate of stock ejection and these produce corresponding variations in the basis weight, formation, and thickness of the paper on the forming wire as the water is drained from the stock. This phenomenon is know as "barring" and can be readily perceived in the finished paper product. Since barring deleteriously affects paper quality, any reduction is highly desirable.

Accordingly, it is an object of this invention to provide a method and apparatus to actively attenuate pressure pulsations in a liquid travelling in a confined space to about −10 to about −30 dB in a spectrum range of about 0.5 to about 100 Hz.

It is another object of this invention to provide a method and apparatus to actively attenuate both random and periodic pressure pulsations in a liquid travelling in a confined space.

Yet another object of this invention is to provide a method and apparatus for actively reducing amplitude fluctuations by a factor of 2 of input fluctuations, or more.

Still another object of this invention is to provide a transducer amplifier system which receives signals from input and error sensors and utilizes them in conjunction with a controller to signal an actuator to produce nulling pulsations to attenuate pulsations in the liquid.

An advantage of this invention is its ability to quickly adjust to changes in operating conditions and provide the desired nulling pulsations.

These and other objects, features and advantages of the invention will become obvious to those skilled in the art when the specification and claims are read in conjunction with the attached figures.

IN THE DRAWINGS

DESCRIPTION OF THE PREFERRED EMBODIMENTS

Figure 1:
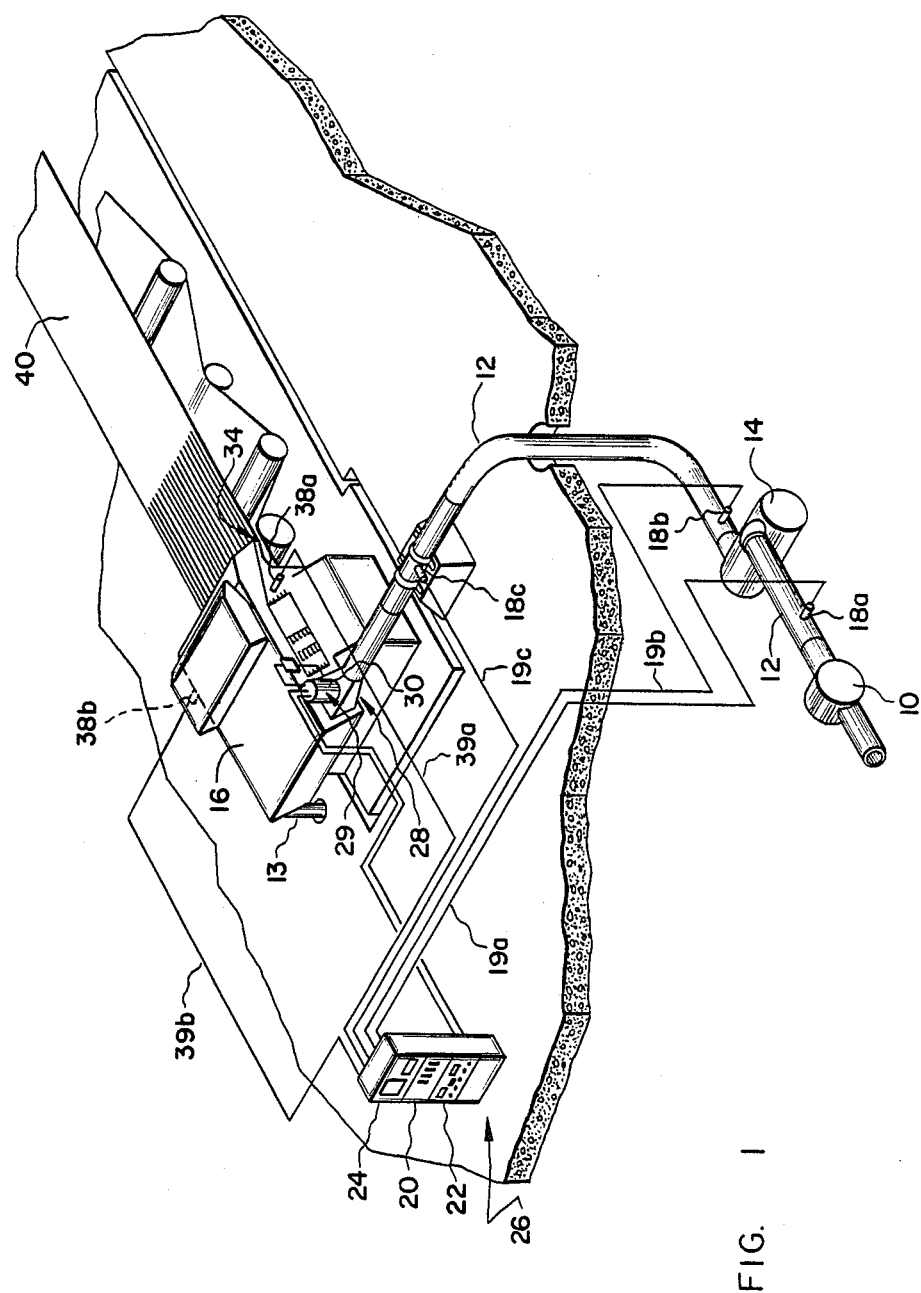
FIG. 1 is a perspective view of the wet end of a papermaking machine showing the headbox, stock inlet pipe, the nulling pressure pulsation actuator and related instrumentation.

In FIG. 1, a fan pump 10 delivers a stream of pressurized pulp stock, which typically comprises about 0.1% to about 1.0% wood pulp fibers and about 99.9% to about 99% water, depending on the type of paper grade or board being produced, through a pipe 12 and a pressure screen 14 which removes some impurities and oversize wood fibers and particles, and into a papermaking machine headbox 16 from where it is discharged in a thin jet stream onto a travelling forming wire 40. Intermediate the fan pump 10 and headbox 16 are a plurality of pressure input sensors 18a, 18b and 18c mounted on the pipe to monitor the liquid pressure pulsations in the pipe at their various locations.

These pressure input sensors 18a, 18b, 18c are electrically connected by wires 19a, 19b, 19c to a pressure transducer amplifier system 24 which is mounted in a console 26. Also mounted in the console is a control monitor 20 and power amplifier 22.

The attenuator 29 is mounted to the stock pipe 12 immediately before it enters the headbox 16 in a transition coupling 28 in which an actuator 30 is mounted. The actuator is commercially available, such as a force shaker of a vibration excitation system but modified to properly inject phase reversed pressure pulses back into the fluid in the pipeline.

Figure 2:
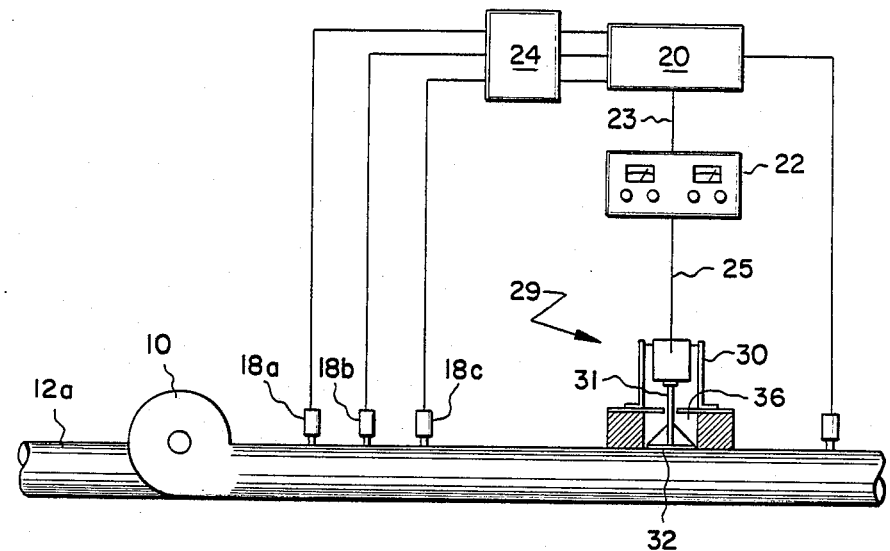
FIG. 2 shows, in simplified and somewhat schematic form, the pressure pulsation generator control loop.

As shown in FIG. 2, input sensors 18a, 18b and 18c are electrically connected to the pressure transducer amplifier system 24 and the control monitor 20 which, in turn, is electrically connected by wires 23 to power amplifier 22 which, in turn, is electrically connected by wire 25 to actuator 30. The amplifier may also be connected by wire to a servo-mechanism which would convert the electrical signal to hydraulic actuation to drive a similar hydraulic vibration excitation system. The actuator includes a flexible diaphragm 32 which is mounted with its outer surface flush with the inner surface of the transition coupling in the pipe so as to produce a minimum of disturbance in the liquid flowing past it in the pipe. A ram 31 moves the diaphragm 32 responsive to signals received by the actuator.

At other locations downstream of the actuator, such as, for example, near the headbox nozzle 34 and the outlet recirculation pipe 13 on the side of the headbox opposite from the side where the stock inlet pipe 12 introduces stock into the headbox, is mounted one or more error sensors 38a, 38b. These error sensors are also electrically connected to the pressure transducer amplifier system 24 by wires 39a, 39b.

The pressure transducer system 24 is powered and, in turn, supplies a lower direct current voltage, such as 24 volts for example, to the input and error sensors. These sensors produce still smaller direct current voltages, such as 5 volts for example, which power the signals transmitted back to the transducer system 24.

Figure 5A:
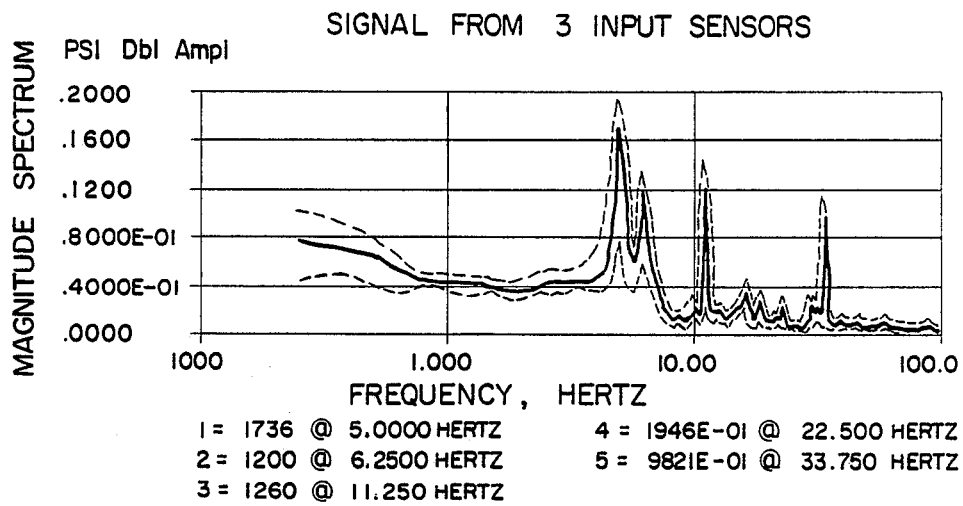
FIG. 5A illustrates expositive pressure waveforms taken at three locations in the pipeline.
Figure 5B:
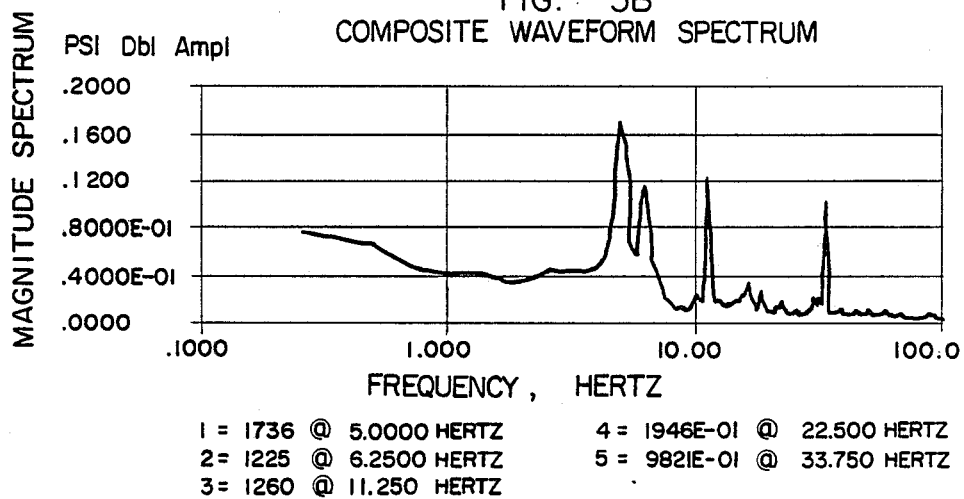
FIG. 5B illustrates a synthesized composite waveform generated by the controller based on the separate sample waveforms shown in FIG. 5A.
Figure 6A:
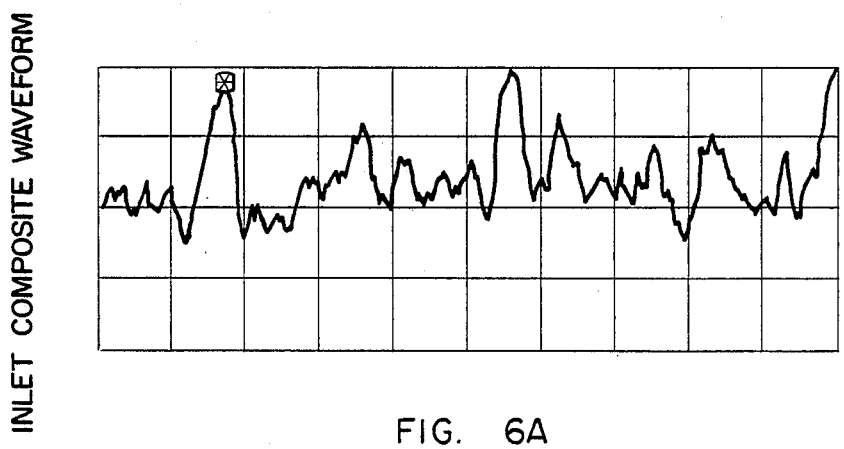
FIGS. 6A, 6B and 6C illustrate an inlet composite waveform, inlet composite phase reversed waveform and a perfectly nulled pulse, respectively.
Figure 6B:
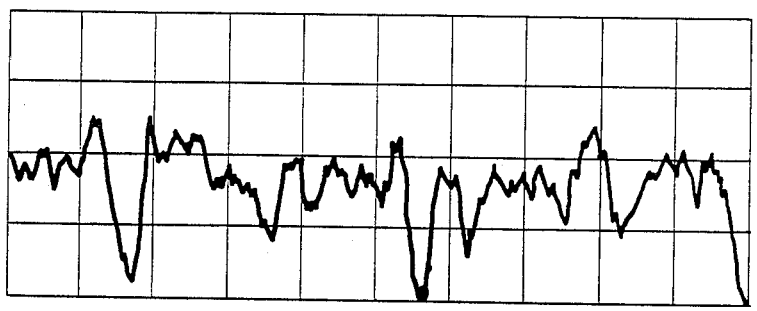
Figure 6C:
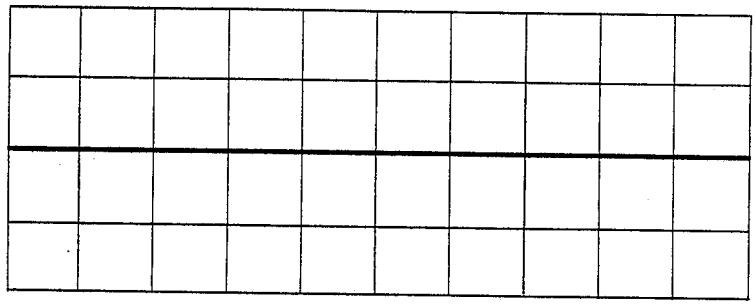
Figure 6D:
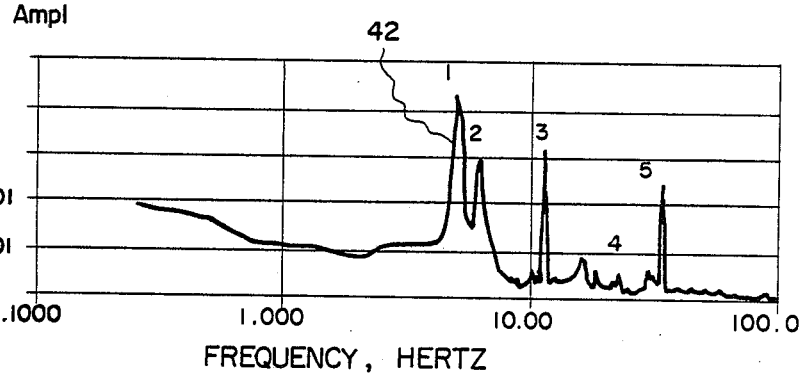
FIGS. 6D and 6E illustrate the magnitude of a composite inlet waveform and the magnitude of a phase reversed composite inlet waveform, respectively, both as a function of frequency.
Figure 6E:
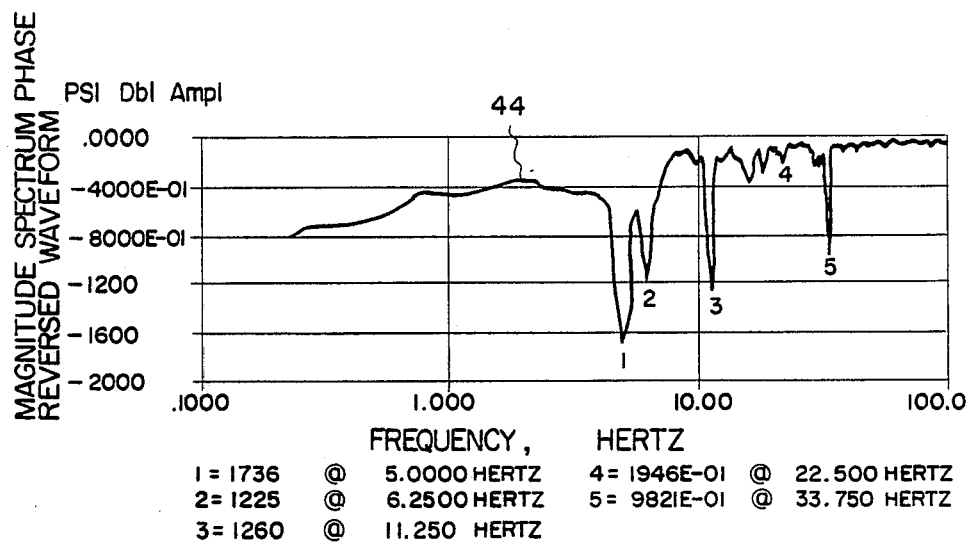

In operation, pressure transducer amplifier system 24 continuously receives signals from pressure input sensors 18a, 18b and 18c at selected points along the pipeline. Since the whole purpose of the attenuator is to make the stock flow into the headbox as smoothly as possible, the preferred location of the attenuator is immediately before the point where the stock is introduced into the headbox. In any case, the attenuator is located between the last possible source of pressure pulsations and the headbox. Accordingly, the preferred location of the input sensors 18a, 18b, 18c is upstream of the attenuator. These input sensors are commercially available, such as Gould series PA 3000 pressure transducers. The control monitor is also commercially available, such as a Nelson Digisonix model dx 30 or dx 40. The number of input sensors used can vary from one to several, depending on the perceived need to measure the pressure pulsations at different locations within pipe 12. The signals from the input sensors are electrically relayed by the amplifier system to the control monitor which electronically sums them and produces a synthesized waveform of the pressure pulsations in terms of psi at different frequencies. In this concept, the summing function doesn't mean the signals are merely added together, but rather they are received serially by the controller from their various locations and are analyzed on an appropriate time-delayed basis according to their location in the pipeline and then used to produce a composite, synthesized waveform. A hypothetical representation of the spectrum of signals received by three input sensors is shown in FIG. 5A. The hypothetical synthesized composite waveform spectrum produced is shown in FIG. 5B. The pressure pulsations from the various input sensors have their signals from the amplifier system to the control monitor 20 timed by the control monitor according to the speed of the liquid flowing past them in the pipeline so the synthesized waveform produced by the controller corresponds in time to the pressure pulses in the liquid as it flows past the actuator diaphragm. The controller 20 then phase reverses the synthesized waveform and produces a series of signals to the power amplifier and, in turn, the actuator to produce a corresponding series of pressure pulses in the diaphragm equal in pressure magnitude (dB) at the corresponding frequencies produced by the original pressure pulsations. FIG. 6D illustrates the synthesized composite waveform 42 produced by the input sensors 18a, 18b, 18c in terms of magnitude as a function of frequency, and the phase-reversed waveform 44 produced in the same terms by the controller 20 responsive to that signal, as shown in FIG. 6E.

The pressure pulsations in the liquid travelling in the pipe are thus met with equal and opposite pressure pulsations produced by the attenuator immediately adjacent the stock inlet into the headbox to effectively null the pressure pulsations, whether they are random or periodic in nature.

Figure 4A:
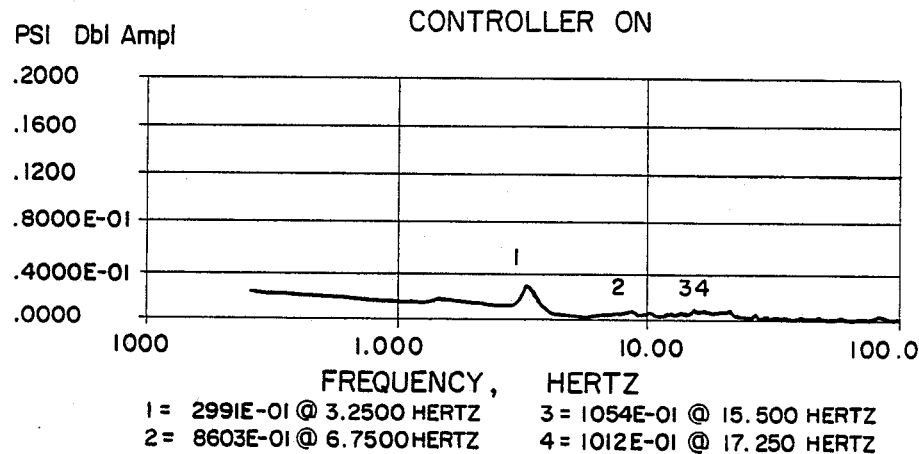
FIGS. 4A and 4B illustrate, in graphic form, pressure amplitude changes with the attenuator on (FIG. 4A) and off (FIG. 4B) as a function of frequency.
Figure 4B:
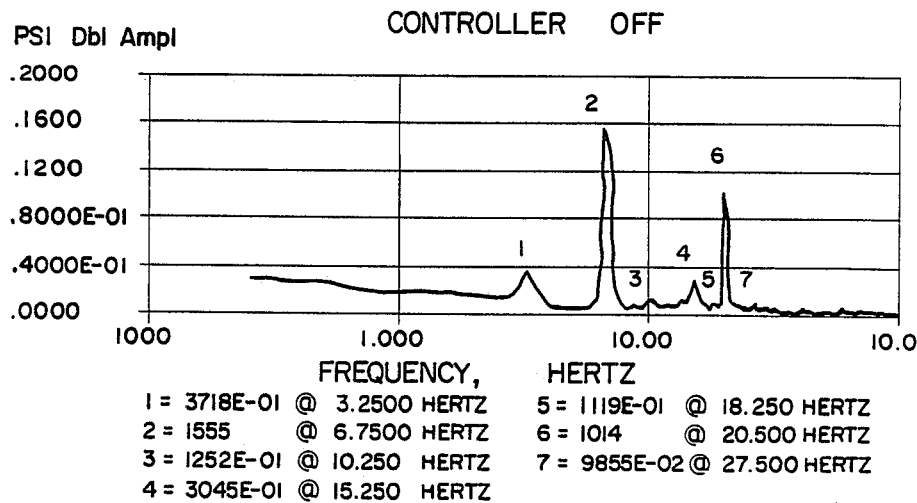

FIG. 4A shows a composite waveform of the pressure as a function of frequency, as sensed by error sensors 38a, 38b in the stock in the headbox with the attenuation system on (18a,18b,18c,20,22,23,24,25,29,38a,38b,-19a,19b, 19c,39a,39b). FIG. 4B shows a corresponding waveform, as sensed by the error sensors 38a, 38b in the headbox with the attenuation system off. The signals from the error sensors are used by the transducer system 24 in conjunction with the signals from the input sensors to further refine the waveform so that the nulling waveform produced more accurately tracks the incoming composite waveform, but in phase-reversed form. Thus, while the input signals and error signals are maintained separate, they are compared by the control monitor so its signals to the amplifier and actuator to provide a more accurate series of nulling pulses.

Figure 3:
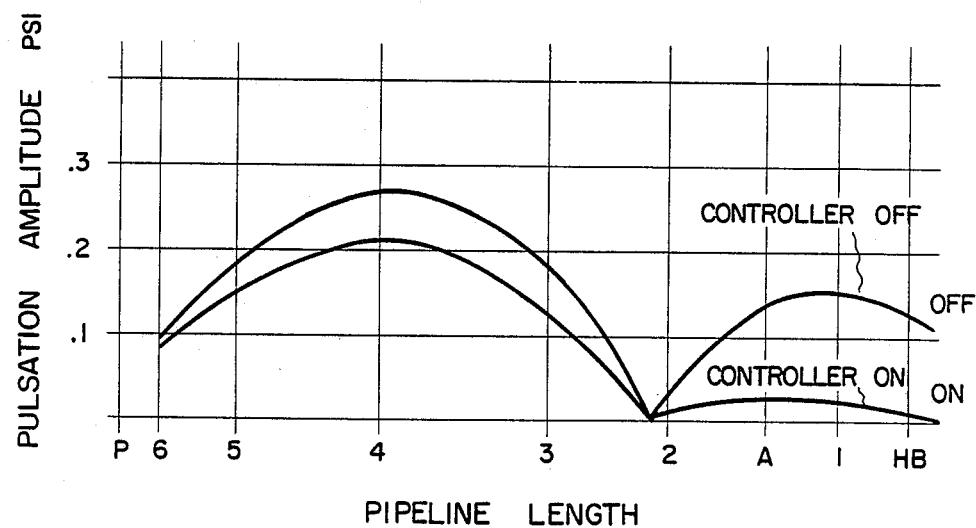
FIG. 3 is a typical pulsation amplitude plot for the pulsation pressures in the stock pipeline at a selected frequency with the attenuator on and off. Similar effects occur at all disturbance frequencies within the active attenuation range.

FIG. 3 is a graphic representation of the change in pulsation amplitude, in terms of pressure, at various locations along the pipeline from downstream of the pump "P" to the headbox "HB" and including the actuator "A" which is intermediate the pump and headbox. The upper line represents the pulsation pressure with the attenuation system off while the lower line represents the pulsation pressure with the actuation system on.

As can be readily seen from FIGS. 3, 4A and 4B, the attenuation produced is dramatic with corresponding pressure pulsations, such as at frequency 2 in FIGS. 4A and 4B, reduced by as much as a factor of approximately 18.

In system operation, a supply of pulp stock is received by fan pump 10 which pressurizes it and introduces the stock into pipeline 12 where it flows through pressure screen 14, past actuator 30 and into the headbox. During this course of travel, it passes input sensors 18a, 18b and 18c, respectively. Also during this course of travel, periodic and random pressure pulsations are introduced into the flowing stock by the fan pump, screen, pipe vibration and the dynamics of the stock flowing through the pipe and around its elbows.

These input sensors relay corresponding electrical signals to the pressure transducer system 24 which converts their signals based on the pressure of the stock pulses in the pipeline at their respective locations into other electrical signals having corresponding strengths. These other electrical signals are sent to control monitor 20 which takes the electrical signal produced by transducer system 24 based on its signal from input sensor 18a and sums it with the electrical signal from input sensor 18b taking into effect an appropriate time delay based on the speed of stock travel in the pipeline between sensors 18a and 18b. In the same fashion, the electrical signal from transducer system 24 based on its signal from input sensor 18c is summed with the corresponding signals from sensors 18a and 18b taking into effect the time delay of the travel of stock between sensor 18c and sensors 18a and 18b.

Control monitor 20 thus receives a constant stream of electrical signals of different strengths from each pressure transducer representing the variation in liquid pressures and frequency of liquid pulsations received by transducer system 24 from the input sensors at various locations in the stock pipeline. The controller monitor electrically sums these signals and produces a corresponding series of responsive signals which it phase-reverses and sends through power amplifier 22 to actuator 30 which flexes its diaphragm at a frequency and magnitude of force and distance into the pipeline to produce a corresponding series of pressure pulsations of equal and opposite frequency and pressure magnitude to the pressure pulsations in the liquid travelling in the pipeline, regardless of whether they are periodic or random in origination and nature, at the arrival of the liquid pulsations in the pipeline opposite the actuator diaphragm 32.

The target spectrum reduction ranges from about −10 dB to about −30 dB which corresponds to a reduction in pressure amplitude by a factor of 3.2 to 32 times, respectively.

In a similar manner, error sensor pressure transducers 38a, 38b send electrical signals based on the magnitude and frequency of the liquid pressure pulsations on either side of the headbox 16 as the stock flows into the headbox and a small portion flows out of the headbox through overflow pipe 13 to be recirculated. Pressure transducer system 24 then produces other electrical signals, based on the signals it receives from the error sensors, to control monitor 20 which sums these signals and produces a composite, synthesized error signal in the same manner as described and illustrated in conjunction with FIGS. 4A, 4B. Controller 20 calculates the transfer function between each individual input sensor and an error sensor to form a synthesized waveform which it can phase reverse and send to the power supply to drive the actuator. The transfer function contains phase information so the controller knows the phase lag between an input sensor and an error sensor. The controller also contains memory information of the amplitude of the input and error signals, and their coherence. Accordingly, the timing of the phase reversed pulse can be set and adjusted until an appropriate null is established at the error sensor. In this manner, the complete frequency content at both input and error locations is measured and the frequency and magnitude of the nulling signal produced by the controller to drive actuator 30 is adjusted based on the error signals to minimize the amplitude of the signals produced at the error sensor locations.

By having several input sensors, it is assured that all the frequencies received by the error sensors will be found in the input sensors somewhere in the pipeline. This allows the composite waveform for phase reversal to be composed of the complete frequency content combined from the input sensors which correlate with the error sensors at their respective locations. The controller drives the actuator to null the frequency at the error sensor location very rapidly. The control monitor also stores its output signal in memory to enable it to lock onto the exact frequency and amplitude of its nulling signal. This reference also allows it to compare and adjust the frequency and amplitude of its subsequent nulling signals quickly.

The controller utilizes two signals to operate in its preferred manner. One signal is an input sensor signal. Preferably, the input sensor signal is a composite signal based on all of the input sensor signals received by the pressure transducer system 24. Similarly, the error sensor signal is a composite signal based on all the error sensor signals received by the transducer system 24. However, if desired, the input and error sensor signals used by the controller 20 could, optimally, be a separate signal received from a single input sensor and a separate signal received from a single error sensor or selected signals of a plurality of input and error sensors, as desired. This permits greater flexibility in the error sensor picking up the most troublesome pulsation frequency and allowing the controller to more accurately signal the actuator via the amplifier to produce the desired phase-reversed pulse.

In order to permit the actuator to provide the greatest range of pressure response possible, it is equipped with a bias pressure chamber 36 which utilizes air pressure to bias the diaphragm 32 against the fluid pressure in the pipeline with a force equal to the nominal liquid pressure in the pipeline to locate the diaphragm in a neutral position in steady-state operation. Thus, if the stock is flowing in the pipeline with absolutely no pressure pulsations at all, diaphragm 32 will be maintained by the air pressure on its other side in a position substantially coincident with the wall of the pipeline in the transition coupling 28. Since the actuator is an active, or powered, type, the actuator ram 31 forcefully moves the diaphragm 32 outwardly upon being signalled so the liquid pressure in the stock flowing through the pipeline cannot move the diaphragm inwardly into the actuator and maintain it there over a period of time to produce a so-called saturated condition in the attenuation system whereby the system cannot respond and move the diaphragm to attenuate the pressure pulsations in the pipeline.

It has been found that nulling cancellation of the pressure pulses flowing in the pipeline can be achieved at various locations in the pipeline, both upstream and downstream. Basically, such nulling cancellation is a matter of timing of the signals to the nulling pressure-producing actuator wherever it is located.

When the system is operating, it monitors both random and periodic pulsations, but tends to respond to pulsations having higher amplitudes first and then to bring lower amplitude pulsations into its model to produce the composite synthesized waveform. Usually, higher amplitude pulsations are associated with periodic pulsations while random pulsations are associated with lower amplitude disturbances.

Thus, an attenuation system which achieves the objects set forth has been shown and described. While a specific embodiment of the invention has been shown and described by way of example, the invention is limited only by the scope of the claims.

What is claimed is:

1. A system for actively attenuating pressure pulses in a confined, flowing liquid, such as paper stock in a pipe, the combination comprising:
    an attenuator having an actuator for driving a diaphragm having an interface with the liquid;
    means for sensing the fluid pressure pulsations in the liquid at selected locations along the confined path of liquid flow, and for providing signals based on these pulsations;
    pressure transducer system means for receiving the signals from the means for sensing the fluid pressure pulsations, and for providing signals corresponding to the pressure amplitude and frequency of these pulsations;
    means for monitoring the signals from the pressure transducer system means and relating these measurements in time from where each of them is sensed to when the pulsations arrive at the actuator, and for producing a model of the pressure pulsations, the model comprising a phase reversed waveform signal comprising a series of pressure pulsations as a function of pulsation frequency;
    amplifier means for receiving the signals from the means for monitoring the pressure pulsations, and signalling the attenuator actuator based on the model of the pressure pulsations to produce nulling pressure pulses within the flowing liquid which oppose the pressure pulsations therein.

2. A system for actively attenuating pressure pulses as set forth in claim 1, wherein:
    the means for monitoring the pressure pulsations includes a controller for signalling the amplifier means to produce nulling pressure pulses in the range of about 0.5 Hz to about 100 Hz to achieve attenuation of about minus 10 to to about minus 30 dB.

3. A system for actively attenuating pressure pulses as set forth in claim 1, wherein:
    the means for sensing the fluid pressure pulsations includes at least one pressure input sensor for measuring pressure pulses and their frequency in the flowing liquid upstream of the attenuator, and at least one error sensor for measuring pressure pulses and their frequency in the flowing liquid downstream of the attenuator.

4. A system for actively attenuating pressure pulses as set forth in claim 1, wherein:
    the pressure transducer system means measures and monitors both random and periodic pulses in the flowing liquid.

5. A system for actively attenuating pressure pulses as set forth in claim 3, wherein:
    the pressure transducer system means maintains separate the signals received from the at least one input sensor and the signals received from the at least one error sensor, and provides two signals to a controller means, one signal based on the signals from the at least one input sensor and the other signal based on the signal from the at least one output sensor;
    the controller means utilize the signals from the pressure transducer system means to produce a model of the pressure pulsations and to signal the actuator to produce nulling pulsations according to the model.

6. A system for actively attenuating pressure pulses as set forth in claim 1, wherein:
    the attenuator includes a bias pressure chamber on the side of the diaphragm opposite the flowing liquid for establishing a bias pressure to maintain the diaphragm in a neutral position in steady-state operation.

7. A method for actively attenuating pressure pulses in a confined, flowing liquid, such as paper stock in a pipe, comprising the steps:
    interfacing the diaphragm of an attenuator with the liquid, the attenuator having an actuator for driving the diaphragm;
    sensing the fluid pressure pulsations in the liquid with one or more input sensors at selected locations along the confined path of liquid flow upstream of the attenuator, and with one or more error sensors at selected locations along the confined path of liquid flow downstream of the attenuator;

measuring the pressure amplitude and frequency of the pulsations and relating these measurements in time from where each of them is sensed to when the pulsations arrive at the attenuator;

producing a pair of signals, one based on the signals from the input sensors, and the other signal based on the signals from the error sensors;

producing a model of the pressure pulsations based on the input and error signals, the model including a phase reversed signal comprising a waveform signal including a series of pressure pulsations as a function of pulsation frequency;

signalling the attenuator actuator based on the model of the pressure pulses to produce nulling pressure pulses within the flowing liquid which opposes the pressure pulses therein.

8. A method for actively attenuating pressure pulses as set forth in claim 7, further including the step:

comparing the signal from the input sensor means and the signal from the error sensor means for coherence when producing the model.

9. A method for actively attenuating pressure pulses as set forth in claim 7, wherein:

the signal from the input sensor means and the signal from the error sensor means used in producing the model is based on one or more of the input sensor means signals and one or more of the error sensor means signals, as desired.

* * * * *